United States Patent [19]

Kasik

[11] Patent Number: 5,579,897
[45] Date of Patent: *Dec. 3, 1996

[54] MAGNETIC CONVEYOR SYSTEM

[75] Inventor: John P. Kasik, Dallas, Tex.

[73] Assignee: SASEB Bakery North America, Inc., Dover, England

[*] Notice: The term of this patent shall not extend beyond the expiration date of Pat. No. 5,147,033.

[21] Appl. No.: 195,831

[22] Filed: Feb. 14, 1994

Related U.S. Application Data

[63] Continuation of Ser. No. 906,442, Jun. 30, 1992, abandoned, which is a continuation of Ser. No. 729,389, Aug. 2, 1991, Pat. No. 5,147,033, which is a continuation of Ser. No. 578,539, Sep. 7, 1990, Pat. No. 5,056,654, which is a continuation of Ser. No. 320,492, Mar. 8, 1989, Pat. No. 4,972,941, which is a continuation of Ser. No. 59,600, Jun. 8, 1987, Pat. No. 4,836,360.

[51] Int. Cl.$^6$ .................................................. B65G 15/58
[52] U.S. Cl. ................................. 198/803.6; 198/690.1; 198/803.01
[58] Field of Search ........................ 198/343.2, 472.1, 198/690.1, 778, 803.01, 803.6, 802, 831

[56] References Cited

U.S. PATENT DOCUMENTS

| | | |
|---|---|---|
| 1,073,126 | 9/1913 | Hitchcock . |
| 1,716,460 | 6/1929 | Pointon . |
| 1,938,294 | 12/1933 | Lauterbur et al. . |
| 1,948,090 | 2/1934 | Alvey ........................................ 198/733 |
| 1,949,684 | 3/1934 | Houlis . |
| 2,264,348 | 12/1941 | Weygant . |
| 2,446,890 | 8/1948 | Stadelman ............................... 198/831 |
| 2,687,202 | 8/1954 | Nordquist et al. ..................... 198/472.1 |
| 2,780,182 | 2/1957 | Rand . |
| 2,940,581 | 6/1960 | CHebuhar ......................... 198/803.6 X |
| 3,027,994 | 4/1962 | Lanham . |
| 3,094,206 | 6/1963 | Stewart et al. ....................... 198/851 X |
| 3,157,270 | 11/1964 | Prucha et al. .......................... 198/350 |
| 3,167,168 | 1/1965 | Park . |
| 3,240,316 | 3/1966 | Huffman et al. . |
| 3,250,377 | 5/1966 | Minichello et al. .................... 198/350 |
| 3,285,394 | 11/1966 | Lanham et al. ..................... 198/838 X |
| 3,338,374 | 8/1967 | Dudley . |
| 3,363,744 | 1/1968 | Green et al. ............................ 198/778 |
| 3,367,474 | 2/1968 | Kerr et al. ........................... 198/831 X |
| 3,440,973 | 4/1969 | Lanham et al. . |
| 3,447,663 | 6/1969 | Sarovich . |
| 3,478,705 | 11/1969 | Lanham et al. . |
| 3,499,521 | 3/1970 | Gildehaus ............................... 198/350 |
| 3,570,651 | 3/1971 | Lanham et al. ......................... 198/778 |
| 3,680,493 | 8/1972 | Lanham et al. ..................... 198/845 X |
| 3,871,510 | 3/1975 | Homeier .......................... 198/803.6 X |
| 3,941,237 | 3/1976 | MacGregor, Jr. . |
| 4,004,681 | 1/1977 | Clewett et al. ..................... 198/802 X |
| 4,181,215 | 1/1980 | Carpenter ............................. 198/477.1 |

(List continued on next page.)

FOREIGN PATENT DOCUMENTS

| | | | |
|---|---|---|---|
| 1014932 | 8/1957 | Germany ................................ 198/350 |
| 2402242 | 1/1974 | Germany ............................. 198/690.1 |

OTHER PUBLICATIONS

Pieper, *Basic Principles of Baking*, Mar. 1971, pp. 72–79.
Matz, *Equipment for Baker*, 1988, pp. 176–361.
Bakery Mart, *New continous proofer/oven system meets high production requirements*, Jan. 1981, p. 193.
Dnaiel, *Bakery Materials and Methods*, 1947, pp. 177–190.
Fance and Wragg, *Up–to–Date Breadmaking*, 1968, pp. 92–96.
Dornblaser, Chaney and Gruber, *New bun line leads way to perfection*, Jul. 1982, pp. 81–88.

*Primary Examiner*—Joseph E. Valenza
*Attorney, Agent, or Firm*—Michael A. O'Neil

[57] ABSTRACT

A conveyor system for use in a continuous proofing and baking apparatus. The system has a conveyor chain, having a plurality of links, which moves along a track. Each link supports a product supporting grid, which has four circular rings. Pole pieces are located in at least some of the rings. Each pole piece has a conical section and can move horizontally relative to the grid. A magnet in each pole piece attaches the pole piece to a product pan.

12 Claims, 3 Drawing Sheets

U.S. PATENT DOCUMENTS

| | | | |
|---|---|---|---|
| 4,276,980 | 7/1981 | Oizumi | 198/851 |
| 4,301,915 | 11/1981 | Michalik et al. | 198/851 |
| 4,544,060 | 10/1985 | Enomoto | 198/690.1 |
| 4,586,601 | 5/1986 | Hodlewsky | 198/690.1 |
| 4,645,070 | 2/1987 | Homeier . | |
| 4,729,470 | 3/1988 | Bacigalupe et al. | 198/838 |
| 4,760,911 | 8/1988 | Bacigalupe et al. | 198/474.1 |
| 4,836,360 | 6/1989 | Kasik | 198/803.6 |
| 4,972,941 | 11/1990 | Kasik | 198/803.6 |
| 5,056,654 | 10/1991 | Kasik | 198/803.6 |
| 5,147,033 | 9/1992 | Kasik . | | us Pat. No. 5,579,897

MAGNETIC CONVEYOR SYSTEM

This is a continuation application Ser. No. 07/906,442, filed Jun. 30, 1992, now abandoned which is a continuation of application Ser. No. 07/729,389, filed Aug. 2, 1991, issuing as U.S. Pat. No. 5,147,033 on Sep. 15, 1992, which is a continuation of application Ser. No. 07/578,539, filed Sep. 7, 1990, issuing as U.S. Pat. No. 5,056,654 on Oct. 15, 1991, which is a continuation of application Ser. No. 07/320, 492, filed Mar. 8, 1989 issuing as U.S. Pat. No. 4,972,941 on Nov. 27, 1990, which is a continuation of application Ser. No. 07/059,600, filed Jun. 8, 1987 issuing as U.S. Pat. No. 4,836,360 on Jun. 6, 1989.

BACKGROUND OF THE INVENTION

1. Field of the Invention

This invention relates in general to a continuous proofing and baking apparatus for use in a bakery. In particular, the invention relates to a continuous proofing and baking apparatus having an improved conveyor system for carrying product pans through the proofing and baking apparatus.

2. Description of Prior Art

In the commercial baking industry, dough products are exposed to a predetermined temperature and humidity environment to cause the dough to rise. Following this proofing operation, the dough products are transferred to an oven for baking.

The dough products may be conveyed from the proofing apparatus to the oven on a continuous conveyor system. The conveyor system has an elongated track which extends through and between the proofing and baking sections of the apparatus. A conveyor chain, having a plurality of links, moves through the elongated track and carries a plurality of product supporting grids. Each product pan is supported by one or more product supporting grids.

As the conveyor chain moves through the proofing and baking apparatus, the track has some straight portions and some curved portions. As the conveyor chain travels from a straight portion to a curved portion of the track, the relative positions of two consecutive product supporting grids will change. The conveyor system must be able to support the product pans, even though the relative positions of the product supporting grids change.

SUMMARY OF THE INVENTION

The conveyor system of the invention is designed for use in a continuous proofing and baking apparatus. The conveyor system has a conveyor chain, having a plurality of links, for movement through an elongated track. Each of the links of the conveyor chain supports a product supporting grid. Each grid has at least one circular ring. A pole piece, having a conical section, is located in the ring, so that the pole piece can move horizontally relative to the product supporting grid.

A magnet is located on the pole piece in order to connect a product pan to the pole piece. The magnet attaches to the bottom of the product pan and releasably connects the pan to the pole piece.

As the conveyor chain moves around a curve in the elongated track, the relative positions of two consecutive product supporting grids change. The corresponding changes in position between the pole pieces and the product supporting grids allow the conveyor system to carry product pans around curves in the elongated track.

DESCRIPTION OF THE PREFERRED EMBODIMENT

Figure 1:
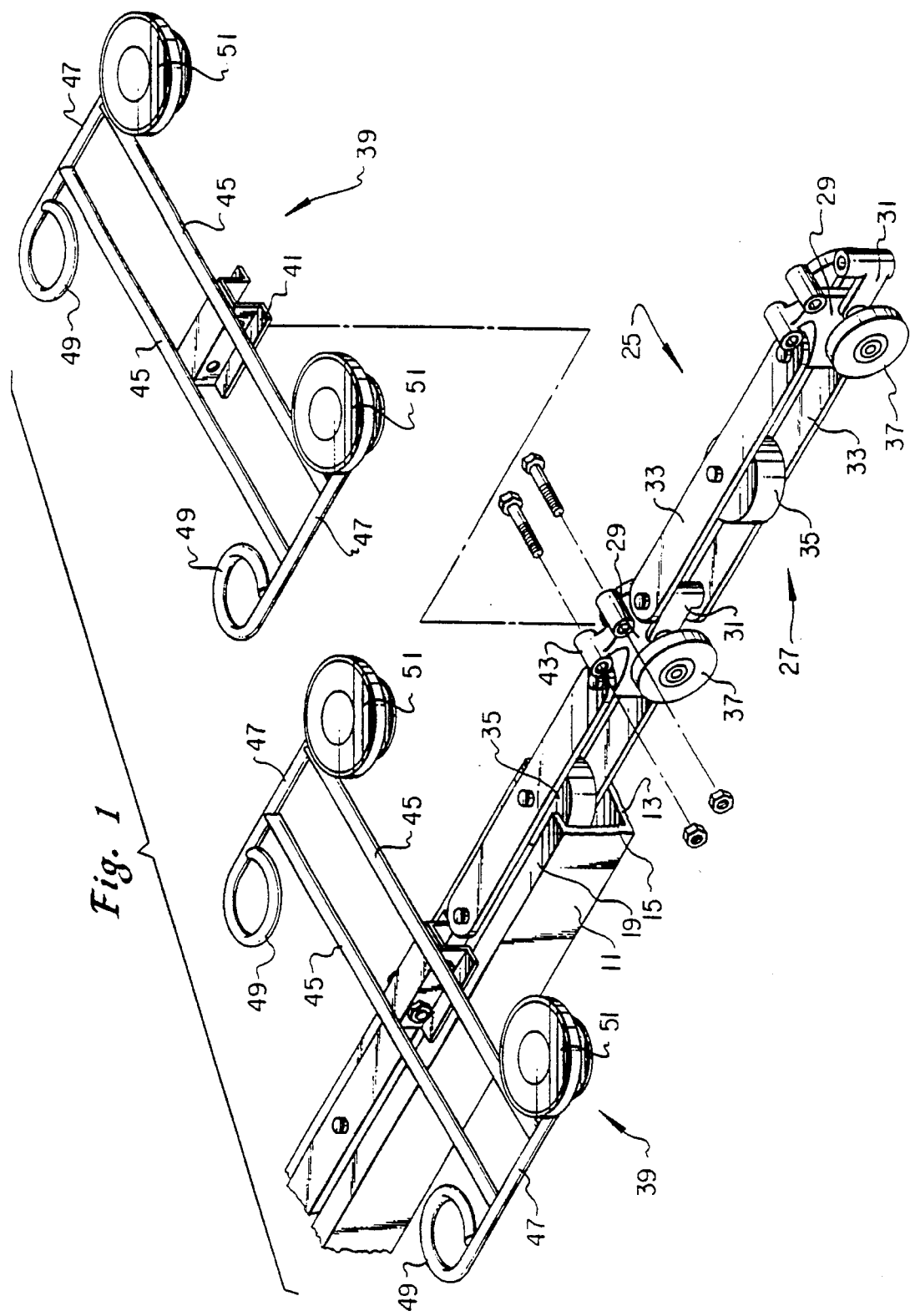
FIG. 1 is a perspective view of the conveyor system of the invention.
Figure 2:
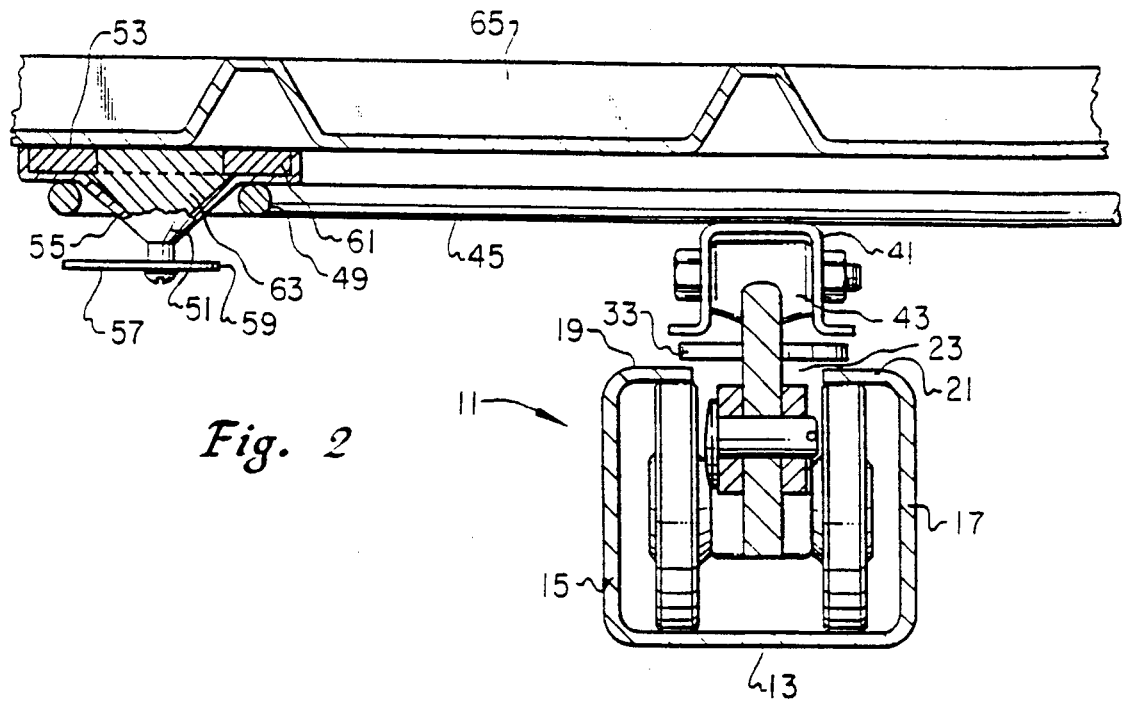
FIG. 2 is a sectional view of the conveyor system of the invention, as seen along lines 2—2 in FIG. 3.

As shown in FIGS. 1 and 2, the conveyor system of the invention includes an elongated track 11. The track 11 has a bottom 13, two sides 15, 17, and two top pieces 19, 21. There is a longitudinal gap 23 between the two top pieces 19, 21.

A conveyor chain 25, having a plurality of links 27, is mounted for movement through the track 11. Each link 27 has a first connection member 29 and a second connection member 31. A pair of vertically spaced, parallel, longitudinal plates 33 extend between the first and second connection members 29, 31. As shown in FIG. 2, the upper plate 33 is located above the gap 23, in order to help keep debris from falling into the track 11.

A horizontal roller 35 is mounted between the two plates 33 to keep the conveyor chain 25 centered within the track 11. A pair of vertical rollers 37 are attached to each first connection member 29 to support the weight of the conveyor chain 25.

As shown in FIGS. 1 and 2, a product supporting grid 39 is attached to each first connection member 29. Each product supporting grid 39 has a cover member 41, which is bolted to a pair of bosses 43 which extend upward from the first connection member 29.

Each product supporting grid 39 has a pair of laterally extending rods 45. A pair of longitudinally extending rods 47 are connected to each end of the laterally extending rods 45. The ends of each longitudinal rod 47 are curved to form a circular ring 49. The four rings 49 are thus located on the four corners of the product supporting grid 39.

At least some of the rings 49 contain pole pieces 51. Each pole piece 51 has an upper circular portion 53, and a lower conical portion 55. The circular portion 53 has a larger diameter than the ring 49, but the conical portion 55 fits within the ring 49.

The pole piece 51 is secured within the ring 49 by locking means, such as a circular washer 57. The washer 57 may be removable from the lower end of the conical portion 55, or the washer 57 may have a flat 59 or a shaped notch, so that the washer 57 can be maneuvered through the ring 49.

The circular portion 53 of the pole piece 51 contains a ring magnet 61. The portion of the circular portion 53 not occupied by the washer 57 may be filled in with a compound 63 or covered with a cap. This compound filler 63 or cap keeps debris from accumulating within the circular portion 53 of the pole piece 51.

A product pan 65 may be supported by the pole pieces 51. The metal product pan 65 is held to the pole pieces 51 by the magnets 61. As shown in FIG. 2, the product pan 65 is not in contact with the lateral or longitudinal rods 45, 47 of the product supporting grid 39.

Figure 3:
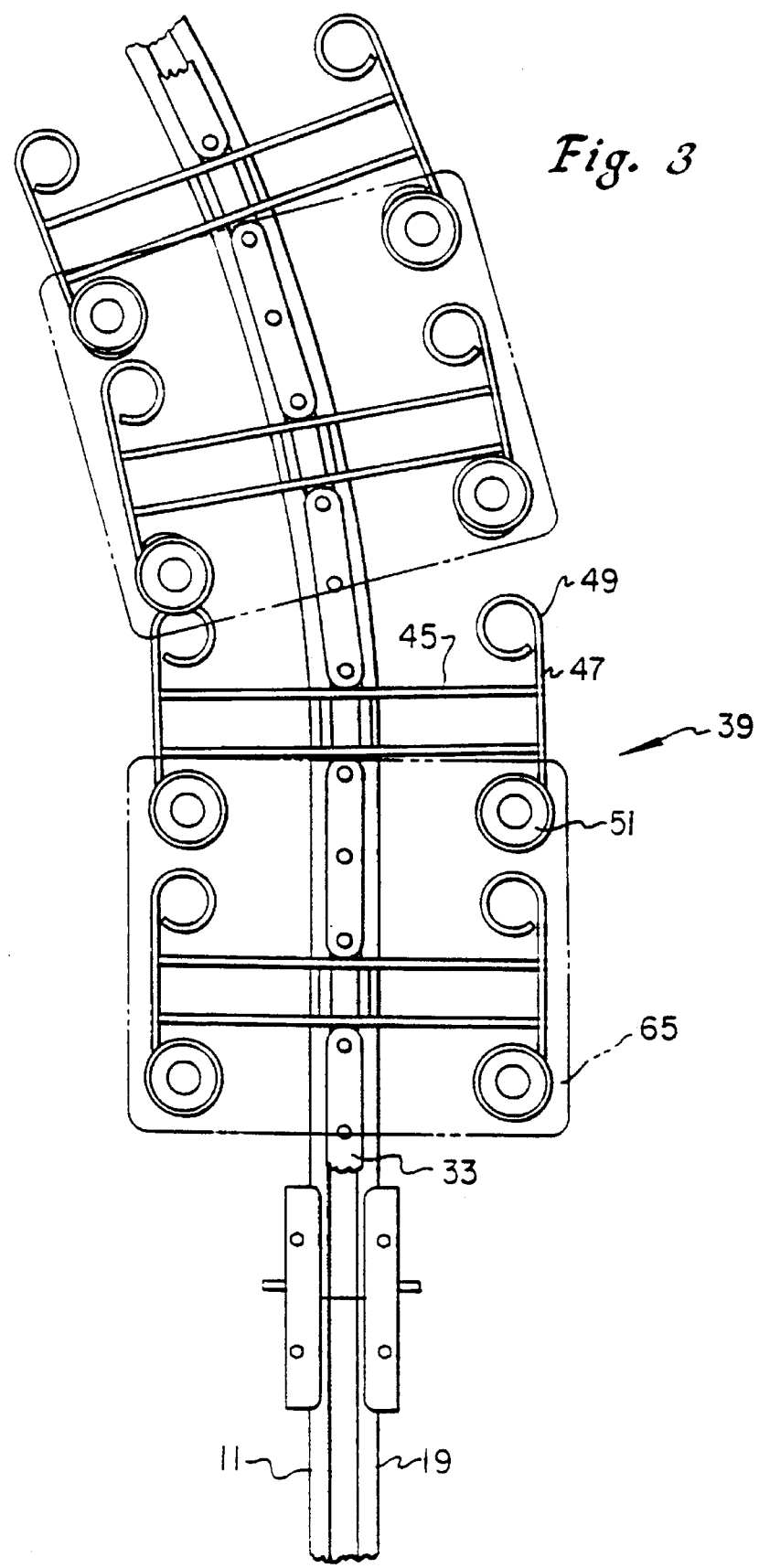
FIG. 3 is a top view of the conveyor system of the invention.

FIG. 3 illustrates a portion of the conveyor chain 25 going around a curve in the track 11. Typically, a product pan 65 is large enough to be supported by two consecutive product supporting grids 39. Therefore, pole pieces 51 are located only in the forward pair of rings 49. If a smaller product pan 65 is used, pole pieces 51 may need to be located in all four rings 49 of each product supporting grid 39.

As a pair of product supporting grids 39 enter a curve in the track 11, the rings 49 on the inside of the curve move closer together, and the rings 49 on the outside of the curve move further apart. For example, the distance from a pole piece 51 in one product supporting grid 39 will typically be 12.5 inches from the pole piece 51 in the next product supporting grid 39. As the product supporting grids 39 enter the curve, the pole pieces 51 on the inside of the curve will move to 11 inches apart, while the rings 49 on the outside of the curve will move to 14 inches apart.

Figure 4:
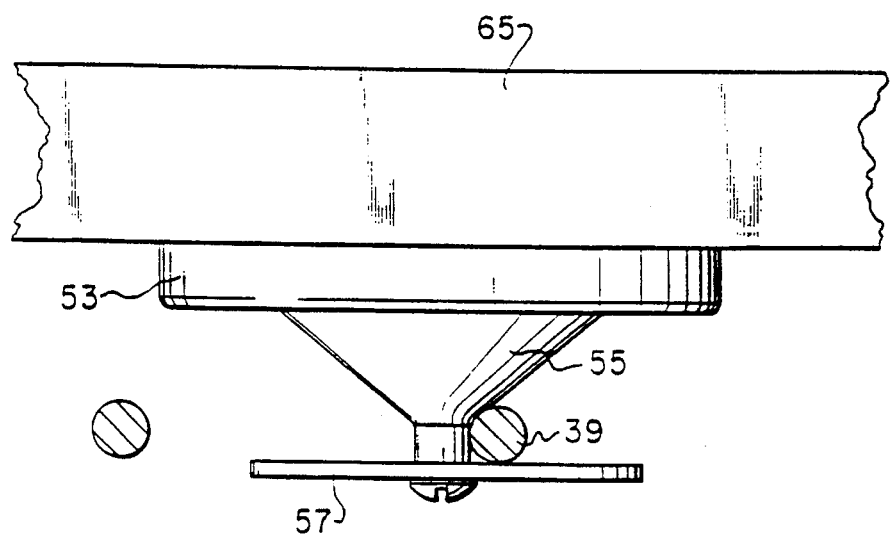
FIG. 4 is a partial side view, partly in section, of a pole piece of the invention.

While the rings 49 are moving relative to one another, the magnets 61 in the pole pieces 51 are attached to the product pan 65, and cannot move relative to one another. Therefore, the pole pieces 51 must move horizontally relative to the rings 49. FIGS. 3 and 4 illustrate how the pole pieces 51 move horizontally relative to the rings 49. As the product supporting grid 39 enters a curve, and the rings 49 move relative to one another, a horizontal force will be applied to the pole pieces 51. The pole pieces 51 are raised vertically slightly as the conical portion 55 of the pole piece 51 moves up on the ring 49. The dimensions of the conical portion 55 are such that the pole piece 51 can move approximately 0.75 inches in any horizontal direction.

When the product supporting grids 39 reenter a straight portion of the track 11, the rings 49 move back to the original position relative to one another. The horizontal force on the pole pieces 51 is removed, and the pole pieces 51 settle back down to their original positions. The conical portion 55 of the pole piece 51 causes the pole piece 51 to return to a centered position within the ring 49.

The conveyor system of the invention has several advantages over the prior art. The product pan 65 is securely fastened to the product supporting grid 39, and yet no horizontal forces are applied to the pans 65 as the pans go around a curve in the track 11. Further, since the product pan 65 is supported by the pole pieces 51 there is no friction against the product supporting grid 39.

Only the preferred embodiment of the invention has been shown. It should be understood that the invention is subject to various rearrangements, modifications, and substitutions without departing from the scope of the invention.

I claim:

1. A conveyor system for transporting products comprising:
   an elongate track extending along a path including at least one arcuate section;
   a chain conveyor coupled to the track for movement along said path, the chain conveyor comprising a plurality of links;
   at least one magnetically attractable product pan for transporting product along said arcuate path;
   at least two grids, a portion of each of said grids extending laterally relative to said elongate track;
   a connection member associated with each of said grids for coupling said grids to said chain conveyor; and
   at least one magnet for coupling by magnetic force the magnetically attractable product pan to at least one of said grids, and for allowing limited movement of both the magnet, and the pan coupled to the magnet, relative to said grid, while retaining the pan in engagement with the grid.

2. The apparatus of claim 1 wherein each of said grids is formed from a plurality of rods.

3. The apparatus of claim 2 wherein each of said grids comprises a pair of laterally extending rods.

4. The apparatus of claim 3 wherein said rods are connected to form product support grids.

5. The apparatus of claim 1 wherein a plurality of said grids are connected to said chain conveyor at predetermined intervals.

6. The apparatus of claim 1 further comprising a continuous proofing and baking apparatus.

7. A continuous proofing and baking apparatus including a conveyor system for transporting products comprising:
   an elongate track extending along a path including at least one arcuate section;
   a chain conveyor coupled to said track for movement along said path, said chain conveyor comprising a plurality of links;
   at least one magnetically attractable product pan for transporting product along said arcuate path;
   at least two grids, formed from a plurality of rods, a portion of each of said grids extending laterally relative to said elongate track;
   a connection member associated with each of said grids for coupling said grids to said chain conveyor; and
   at least one magnet for coupling by magnetic force the magnetically attractable product pan to at least one of said grids, and for allowing limited movement of both the magnet, and the pan coupled to the magnet, relative to said grid, while retaining the pan in engagement with the grid.

8. The apparatus of claim 7 wherein a plurality of said grids are connected to said chain conveyor at predetermined intervals.

9. The apparatus of claim 7 wherein each of said grids comprises a pair of laterally extending rods.

10. The apparatus of claim 9 wherein said rods are connected to form product support grids.

11. The apparatus of claim 9 wherein a plurality of said grids are connected to said chain conveyor at predetermined intervals.

12. A continuous proofing and baking apparatus including a conveyor system for transporting products comprising:
   an elongate track extending along a path including at least one arcuate section;
   a chain conveyor coupled to said track for movement along said path, said chain conveyor comprising a plurality of links;
   a plurality of magnetically attractable product pans for transporting product along said arcuate path;
   a plurality of grids, formed from a plurality of rods, a portion of each of said grids extending laterally relative to said elongate track;
   a plurality of connection members associated with each of said grids for coupling said grids to said chain conveyor; and
   a plurality of magnets for coupling by magnetic force the magnetically attractable product pan to at least one of said grids, and for allowing limited movement of both the magnet, and the pan coupled to the magnet, relative to said grid, while retaining the pan in engagement with the grid.

* * * * *

UNITED STATES PATENT AND TRADEMARK OFFICE
CERTIFICATE OF CORRECTION

PATENT NO. : 5,579,897
DATED : December 3, 1996
INVENTOR(S) : John P. Kasik

It is certified that error appears in the above-indentified patent and that said Letters Patent is hereby corrected as shown below:

On title page, item [73]
For the Assignee, please replace "SASEB" with "SASIB."
item [56]
Under Other Publications, please replace "Dnaiel" with "Daniel."

Signed and Sealed this

Twenty-second Day of April, 1997

*Attest:*

BRUCE LEHMAN

*Commissioner of Patents and Trademarks*

*Attesting Officer*